June 24, 1941.  R. A. SANDBERG  2,246,815
AUTOMOBILE LOCK STRUCTURE
Filed Oct. 14, 1940
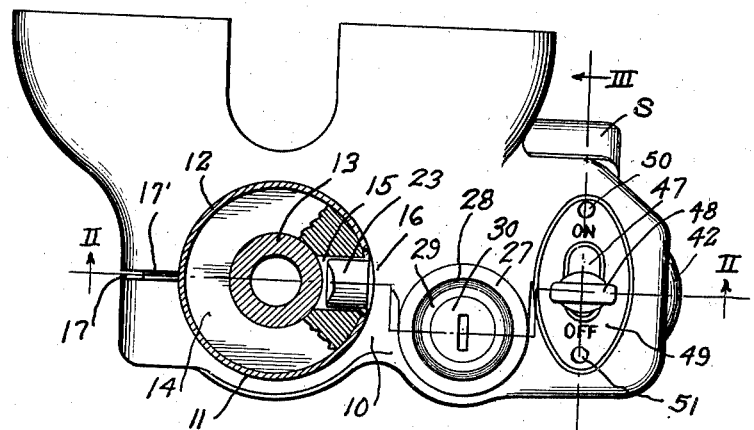
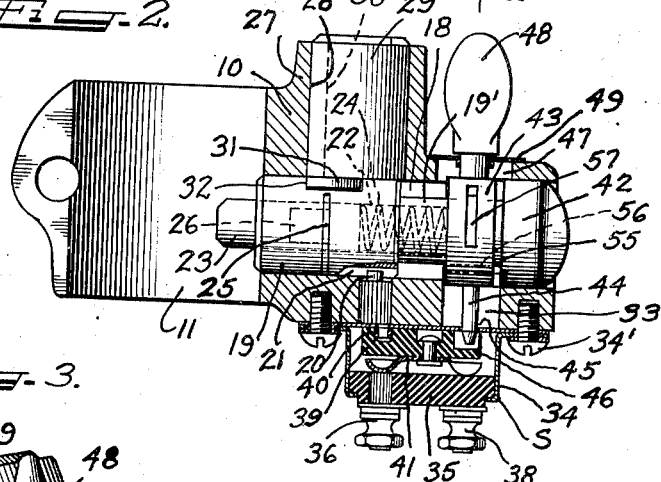
Inventor
RAY A. SANDBERG.

Patented June 24, 1941

2,246,815

UNITED STATES PATENT OFFICE 2,246,815

AUTOMOBILE LOCK STRUCTURE

Ray A. Sandberg, Waukegan, Ill., assignor to Houdaille-Hershey Corporation, Detroit, Mich., a corporation of Michigan Application October 14, 1940, Serial No. 361,090

2 Claims. (Cl. 70—252)

My invention relates to lock structure, particularly unitary lock structures for locking the steering and electrical circuit, such as the ignition circuit, on automotive vehicles.

My invention relates particularly to a type of lock structure, such as is disclosed in Van Sickel Patent No. 1,917,620 July 11, 1933, in which the hub of a switch actuating structure receives and is rotatable on the outer end of the steering shaft locking bolt, with interlocking connection between the hub and the bolt, and with the switch actuating pin extending radially in one direction from the hub and a manually engageable lever extending radially from the hub at a point diametrically opposite to the pin. With such prior arrangement, if the switch actuating structure hub should tend to cant owing to the friction of the locking bolt sliding therethrough to its unlocking position, such canting can be rectified when the hub is turned by pressure against the manually engageable lever and the switch actuating structure is readily operable without resistance. However, in some modern installations in automobiles, it is necessary to so mount the switch relative to the actuating lever, that the actuating lever, in order to be readily accessible, must be set on the hub at an angle with the switch actuating pin which is less than 180°, and with such arrangement it has been found that, after canting or slight displacement of the actuating structure hub by shift of the locking bolt therethrough, the hub cannot so readily be brought back to its proper operating position by manipulation of the lever, and the main purpose of this invention is therefore to provide simple arrangement which will hold the switch pin and lever supporting hub against canting or displacement by locking bolt movement therethrough, so that there will be no material resistance to easy operation of the hub for setting and control of the switch.

My invention is incorporated in the structure shown on the drawing, in which drawing:

Figure 1 is a plan view of the lock structure;

Figure 2 is a section on plane II—II of Figure 1; and

Figure 3 is a section on plate III—III of Figure 1.

The lock structure shown and to which my invention is applied, comprises the body 10 having at the left side thereof the passageway 11 for the steering column 12 through which extends the steering shaft 13 on which the locking collar 14 is secured. This locking collar has the locking passage 15 therethrough in register with the passageway 16 through the steering column, for the locking bolt plunger of the steering locking bolt. The body 10 adjacent to the passageway 11 has the split 17, and a screw 18 extending through the body and split tends to draw or contract the body securely around the steering column for rigid support of the body on the column.

Extending horizontally through the body 10 from the passageway 11 is the bore 18 in which the lock bolt 19 is shiftable but restrained against rotational movement by a stop 20 engaging in the longitudinal channel 21 in the bolt. The bolt 19 has the bore 22 for the locking plunger 23 which is urged outwardly by a spring 24, a key 25 engaging in the slot 26 in the plunger limiting the plunger in and out movement.

The body 10 has the boss 27 extending upwardly therefrom which has the bore 28 for the lock cylinder 29 through which extends the key operable tumbler barrel 30 terminating in a cam 31 extending into the slot 32 in the bolt 19, so that upon turning of the barrel by a suitable key, the locking bolt may be shifted to its locking or unlocking position.

Extending diagonally downwardly and rearwardly from the outer end of the bore 18 is the passageway 33 in the body 10, and secured to the body to extend across the lower end of the passageway is the switch structure S. The switch shown comprises a box 34 secured to the lock body 10 as by screws 34', the cover 35 for the box mounting circuit terminals such as the terminal 36 for connection with the battery, a terminal 37 for connection with the ignition circuit, and another terminal 38 for connection with some other circuit, for example the circuit for the gauges on the instrument board. Within the switch box is the switch block 39 pivoted at 40 and supporting the switch blade 41 which at one point is always in engagement with the battery terminal 36 and whose other contact points are engageable with the terminals 37 and 38 when the switch block is swung.

The outer portion 19' of the locking bolt is of reduced diameter and terminates in a guide head or cap 42 engaging the sides of the bore 18. This reduced portion 19' receives the hub 43 of the switch actuating structure. Depending downwardly from the hub is the switch actuating pin 44 which extends through a slot 45 in the bottom of the switch box and into a recess 46 in the switch block 39 so that when the hub 43 is rotated the switch block is swung for closing or opening of the switch. A passageway 47 extends substantially upwardly through the body 10 from the passageway 33, and through this passageway 47 extends the manually engageable arm or lever 48 for rotating the hub 43 for switch operation. An escutcheon plate 49 covers the passageway 47 and is secured as by pins 50 and 51, this escutcheon plate assisting in guiding the lever 48 during switch operation. A spring-pressed ball 52 is engageable in notches 53 and 54 in the hub 43 for yieldingly holding the hub in position for switch opening or closure.

The bolt reduced end or neck portion 19' has a key 55 projecting radially therefrom for reception in the keyway 56 in the hub 43. The escutcheon plate 49 guiding the lever 48, and the slot 56 guiding the switch actuating pin 44 tend to hold the hub 43 against axial movement. When, as shown on Figures 2 and 3, the bolt 19 is in its steering locking position, the key 55 will be within the keyway 56, and as the bolt is locked against rotation by the pin 29, the hub 43 will then be locked against rotation and against switch operation, the switch being in its open position. However when the locking bolt is shifted to its unlocking position by turning of the lock barrel 30, the key 55 will be withdrawn from the keyway 56 and then the hub 43 will be unlocked and may be rotated for switch closing and opening. When the steering locking bolt is in its unlocking position and the switch is closed, the hub adjacent to its keyway 56 will be in front of the key 55 and therefore the lock bolt cannot be shifted back to its locking position until the hub 43 has been rotated for switch opening.

As has already been described, the passageway for the switch operating pin 44 extends diagonally downwardly and rearwardly and the passageway 47 for the operating lever 48 extends substantially vertically upwardly, and therefore the angle between the lever and the pin is less than 180°. It was found that this arrangement more or less unbalanced the hub 43 when the lever 48 was swung for switch closure or opening after the steering locking bolt was shifted to its unlocking position, and the hub 43 tended to stick. To restore the balance and easy operation and prevent sticking of the hub I have provided simple guide and stabilizing means for the hub 43. As shown, a circumferentially extending guide channel 57 is provided in the hub substantially diametrically opposite the pin 44 and a guide member is provided in the body 10 for engagement in this channel. As shown, this guide member is the pin 51 which holds the escutcheon plate 49 in place, this pin having been lengthened to project into the channel 57. With this arrangement, engagement of the pin 44 in the slot 45 and the engagement of the pin 51 in the channel 57 will provide two diametrically opposite guide points for the hub 43 which will tend to hold the hub 43 against canting so that it may be easily rotated by swing of the lever 48 for switch control.

I thus provide, in locking structure of the type described, simple and efficient means for easing and balancing the operation of the switch structure where the actuating lever is at an angle considerably less than 180° with the switch actuating pin. I do not, however, desire to be limited to the exact arrangement and operation shown and described as changes and modifications may be made without departing from the scope of the invention.

I claim as follows:

1. A lock structure of the class described comprising a housing, a locking bolt shiftable axially in said housing to locking or unlocking position, a switch on said housing, a hub in said housing receiving and rotatable on said bolt, a switch on said housing, a switch actuating pin extending from said hub for actuation of said switch when said hub is rotated, an actuating lever for said hub extending therefrom at an angle materially less than 180° with said pin, an escutcheon plate on said housing for guiding said lever and tending to prevent lateral movement of said lever and hub, pins securing said escutcheon plate to said housing, and a guide channel in said hub, one of said pins extending into said channel for cooperation therewith to guide the rotary movement of said hub and to hold it against axial movement.

2. A steering and ignition lock comprising a housing, a lock bolt shiftable in said housing for locking or unlocking the steering, an ignition switch on said housing, a hub in said housing receiving and rotatable on said bolt, a switch actuating pin extending from said hub for operation of said switch when said hub is turned, guide means on said switch for said pin tending to prevent lateral movement of said pin in the direction of the hub axis, an actuating lever for said hub extending therefrom at an angle substantially less than 180° with said pin, an escutcheon plate on said housing tending to hold said lever against lateral movement thereof in the direction of the hub axis, pins securing said escutcheon plate to said housing, a guide channel in said hub substantially diametrically opposite to said switch actuating pin, one of said escutcheon holding pins extending into said guide channel for assisting said switch actuating pin guide means and said escutcheon plate in holding said hub against axial movement and canting whereby said hub may be easily actuated by said lever for switch operation.

RAY A. SANDBERG.